(12) United States Patent
Sudries et al.

(10) Patent No.: US 11,913,369 B2
(45) Date of Patent: Feb. 27, 2024

(54) MIXER AND EXHAUST SYSTEM

(71) Applicant: Faurecia Emission Control Technologies (Shanghai) Co., Ltd, Shanghai (CN)

(72) Inventors: Fabien Sudries, Gyeonggi-do (KR); Vikas Jukanti, Bangalore (IN); Vijaykumar Madegowda, Bangalore (IN); Haneesh Penubolu, Bangalore (IN); Rajeev Naik, Bangalore (IN)

(73) Assignee: Faurecia Emission Control Technologies (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/952,058

(22) Filed: Sep. 23, 2022

(65) Prior Publication Data
US 2023/0096559 A1    Mar. 30, 2023

(30) Foreign Application Priority Data
Sep. 24, 2021  (CN) .......................... 202122325394.6

(51) Int. Cl.
*F01N 3/28*    (2006.01)
*F01N 3/20*    (2006.01)

(52) U.S. Cl.
CPC ......... *F01N 3/2892* (2013.01); *F01N 3/2066* (2013.01); *F01N 2240/20* (2013.01); *F01N 2340/00* (2013.01); *F01N 2610/1453* (2013.01)

(58) Field of Classification Search
CPC .. F01N 3/2892; F01N 3/2066; F01N 2240/20; F01N 2340/00; F01N 2610/1453

USPC ............................................................ 60/324
See application file for complete search history.

(56) References Cited

U.S. PATENT DOCUMENTS

| | | | | |
|---|---|---|---|---|
| 8,726,643 | B2 * | 5/2014 | Way ........................ | F01N 13/18 60/303 |
| 11,208,933 | B2 * | 12/2021 | Wang ..................... | F01N 3/2892 |
| 11,230,958 | B2 * | 1/2022 | Tucker ................ | B01F 25/4233 |
| 2009/0044524 | A1 * | 2/2009 | Fujino ..................... | B01D 53/90 60/303 |
| 2015/0202569 | A1 * | 7/2015 | Kimura ................. | F01N 3/2892 422/148 |
| 2016/0298518 | A1 * | 10/2016 | Kloeckner ............ | F01N 3/2892 |

* cited by examiner

*Primary Examiner* — Kenneth J Hansen
*Assistant Examiner* — Kelsey L Stanek
(74) *Attorney, Agent, or Firm* — Quarles & Brady LLP

(57) ABSTRACT

This application relates to a mixer and an exhaust system. Wherein, the mixer comprises a pipe, comprising a side wall that comprises an opening; a doser mounting base provided on the opening of the side wall of the pipe, connecting the pipe through the opening, defining a first space, and comprising an injection inlet; and an attachment, comprising a chamber portion and a deflector portion, wherein the chamber portion comprises a chamber portion inlet corresponding to the injection inlet, and a chamber portion outlet corresponding to the opening of the side wall of the pipe; and the deflector portion extends from a side wall of the chamber portion and makes the pipe, the side wall of the chamber portion and the chamber portion inlet fluidly connected, and the attachment constitutes a swirling structure that forms a swirling movement of exhaust at the chamber portion inlet.

15 Claims, 5 Drawing Sheets

MIXER AND EXHAUST SYSTEM

CROSS-REFERENCE TO RELATED APPLICATIONS

This application claims priority to Chinese Application No. 202122325394.6 filed Sep. 24, 2021, the disclosure of which is incorporated herein by reference in its entirety and for all purposes.

TECHNICAL FIELD

The application relates to a field of engine exhaust, in particular to a mixer and an exhaust system.

BACKGROUND

Engine exhaust system processes hot exhaust generated by the engine through various upstream exhaust components to reduce emissions of pollutants. Various upstream exhaust components can comprise one or more of the following components: pipe, filter, valve, catalyst, silencer, etc. For example, the upstream exhaust treatment component directs the exhaust to a selective catalytic reduction (SCR) catalyst with an inlet and an outlet. The outlet connects the exhaust to the downstream exhaust components. The mixer is located upstream of the inlet of the SCR catalyst. In the mixer, the exhaust generates swirling movement or rotating movement. Doser is used to inject reductant such as urea aqueous solution into the exhaust flow from the upstream of SCR catalyst, so that the mixer can fully mix urea and exhaust and discharge them into SCR catalyst for reduction reaction to generate nitrogen and water, so as to reduce the emission of nitrogen oxides from the engine. The doser can be fixed through the mounting base of the mixer to spray the spray of urea aqueous solution into the mixer.

In the mixer, the urea spray sprayed from the doser needs to prevent urea crystallization, so as not to affect the mixing performance of the mixer and the treatment performance of nitrogen oxides. The inventor found that it is more necessary to pay attention to the urea crystallization of the mixer, especially when the exhaust temperature is low.

SUMMARY

An object of the application is to provide a mixer.

Another object of the application is to provide an exhaust system.

A mixer according to one aspect of the application comprises a pipe comprising a side wall, wherein the side wall comprises an opening; a doser mounting base, provided on the opening of the side wall of the pipe, connecting the pipe through the opening, defining a first space, and comprising an injection inlet; and an attachment comprising a chamber portion and a deflector portion, wherein the chamber portion comprises a chamber portion inlet corresponding to the injection inlet and a chamber portion outlet corresponding to the opening of the side wall of the pipe; and the deflector portion extends from the side wall of the chamber portion and makes the pipe, the side wall of the chamber portion and the chamber portion inlet fluidly connected, and the attachment constitutes a swirling structure that forms a swirling movement of exhaust at the chamber portion inlet.

In one or more embodiments of the mixer, the chamber inlet is arranged in non-contact with the injection inlet, and a gap between the chamber inlet and the injection inlet is less than 10 mm.

In one or more embodiments of the mixer, the chamber portion comprises a cylindrical member located on the first space. Two ends of the cylindrical member are respectively the chamber portion inlet and the chamber portion outlet. A side wall of the cylindrical member is a closed structure. The deflector portion comprises a deflecting member extending from the side wall of the cylindrical member. The deflecting member comprises a first catching plate, which extends from the side wall of the cylindrical member into the pipe through the opening of the side wall of the pipe, and a second catching plate, which intersects the first catching plate.

In one or more embodiments of the mixer, the deflecting member comprises a controlling plate. The controlling plate is arranged opposite to the first catching plate, and an axial position of the controlling plate is between the chamber portion inlet and the first catching plate; and the first catching plate is perpendicular to an axis of the cylindrical. The second catching plate is perpendicular to the first catching plate In one or more embodiments of the mixer, the controlling plate comprises a first controlling plate, arranged at an axial position corresponding to the chamber portion inlet, partially surrounding the chamber portion inlet, and connecting with the second catching plate. The first catching plate is parallel to the first controlling plate. Two ends of the second catching plate are respectively connected with the first controlling plate and the first catching plate.

In one or more embodiments of the mixer, the controlling plate further comprises a second controlling plate. The second controlling plate fully surrounds the side wall of the cylindrical member. An axial position of the second controlling plate is located between the axial positions of the first catching plate and the first controlling plate.

In one or more embodiments of the mixer, the second controlling plate and the first catching plate are integrated, whose connect structure is a step structure, and the second catching plate and the first controlling plate are integrated; or the first controlling plate, the second catching plate and the first catching plate are integrated; or the deflector portion is integrally formed; or the attachment is integrally formed.

In one or more embodiments of the mixer, height of the cylindrical member is less than 25 mm.

An exhaust system according to one aspect of the application comprises a mixer described in any of the above and a doser, wherein the pipe is used for providing flow of exhaust, the doser is used for injecting a reductant spray to the mixer, and the doser is set on the doser mounting base.

In one or more embodiments of the exhaust system, an axis of the doser coincides with an axis of the chamber portion.

The progressive effect of the application comprises that by setting the structure of attachment in the mounting base, as well as the structure of the chamber portion and the deflector portion, the urea crystallization is reduced and the exhaust back pressure is less effected. At the same time, the mixer has good versatility so as to adapt to the doser with various structures. The exhaust system has good performance in treating nitrogen oxides.

BRIEF DESCRIPTION OF THE DRAWINGS

The above and other features, properties and advantages of the application will become more obvious through the following description in combination with the attached drawings and embodiments. It should be noted that the attached drawings are only examples, which are not drawn according to the conditions of equal scale, and should not be used as a limitation on the scope of protection actually required by the application, in which.

Figure 1:
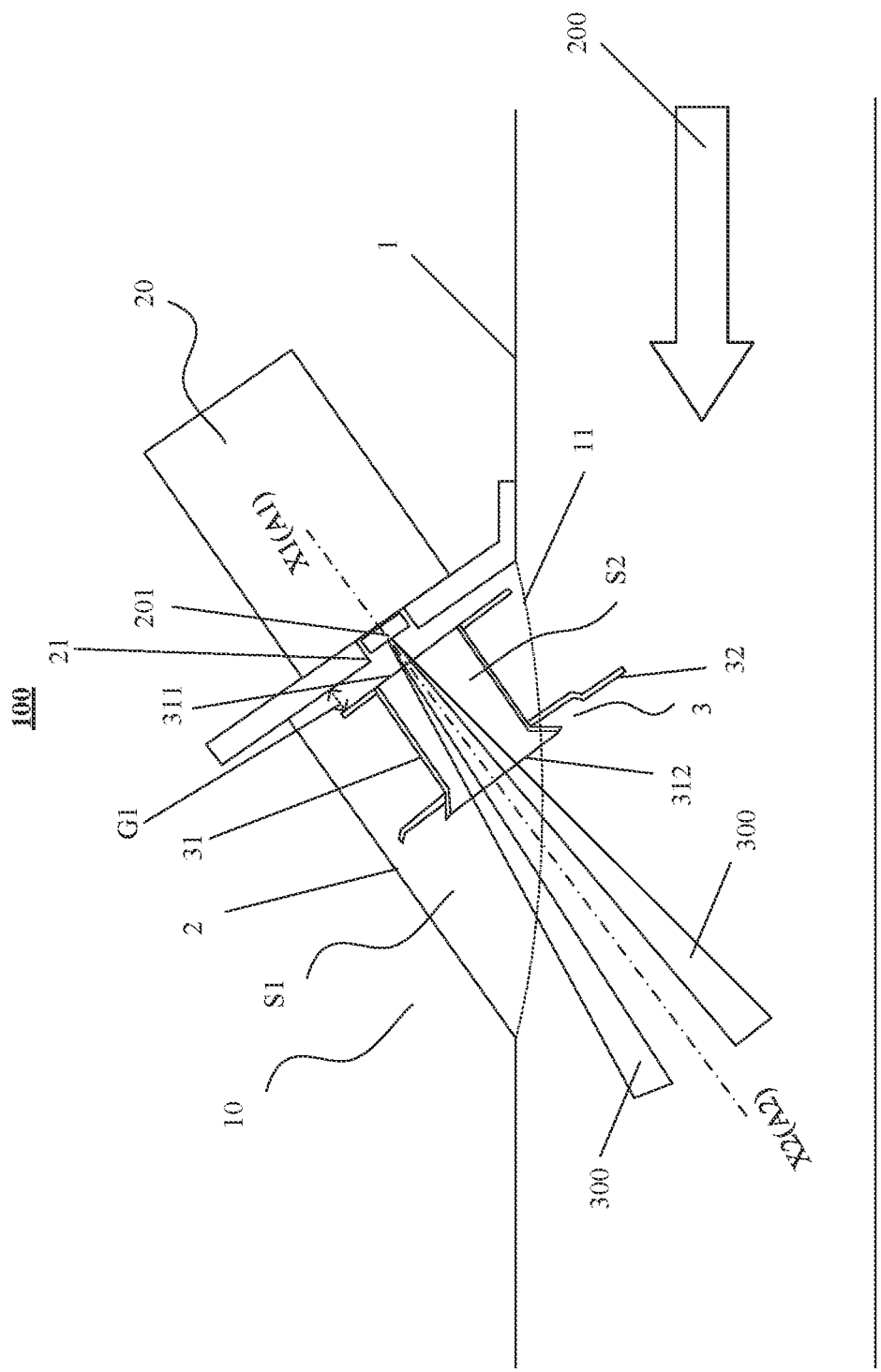
FIG. 1 is a structural diagram of an exhaust system of an embodiment.

REFERENCE SIGNS 100 exhaust system
10 mixer
1 pipe
11 opening
2 doser mounting base
21 injection inlet
3 attachment
31 chamber portion
311 chamber inlet
312 chamber outlet
310 cylindrical member
3100 conical member
3101, 3102 openings at both axial ends of cylindrical member
3103 side wall of cylindrical member
32 deflector portion
320 deflector member
3201 first catching plate
3202 second catching plate
3203 controlling plate
32031 first controlling plate
32032 second controlling plate
20 doser
201 nozzle
200 exhaust
300 spray

DETAILED DESCRIPTION OF EMBODIMENTS

The following discloses a variety of different implementations or embodiments of the subject technical proposal. In order to simplify the disclosure, the following describes specific examples of each element and arrangement. Of course, these are only examples, not limiting the protection scope of the application.

It should be noted that in the following description, for example, "an embodiment", "one embodiment", and/or "some embodiments" refer to a feature, structure or characteristic related to at least one embodiment of the present application. Therefore, it should be emphasized and noted that "an embodiment" or "one embodiment" or "one or more embodiments" mentioned twice or more in different positions in this specification do not necessarily refer to the same embodiment. In addition, some features, structures or characteristics in one or more embodiments of the present application may be appropriately combined.

Referring to FIG. 1, in an embodiment, the exhaust system 100 of the engine exhaust system comprises a mixer 10 and a doser 20. The mixer comprises a pipe body 1, a doser mounting base 2 and an attachment 3. For the engine exhaust system, the pipe body 1 provides a flow space for the exhaust 200. The exhaust 200 containing nitrogen oxide pollutants flows to the pipe body 1 and is mixed with the spray 300 of the reductant solution spray sprayed by the doser 20. The mixed flow flows out of the mixer 1 and enters the SCR catalyst. Under the action of the SCR catalyst, the mixed flow is reduced to produce nitrogen and water for dealing with nitrogen oxides in exhaust.

Continuing to refer to FIG. 1, the doser 20 is arranged on the doser mounting base 2, and the doser mounting base 2 is installed on the opening 11 of the side wall of the pipe body 1. Through the opening 11, the doser mounting base 2 is connected with the pipe body 1. The doser mounting base 2 defines the first space S1 and has an injection inlet 21. As shown in FIG. 1, the doser mounting base 2 defines that the path for the spray 300 entering the pipe body 1 of the mixer 1 and mixing with the exhaust 200 is the first space S1 for entering the doser mounting base 2 from the spray inlet 21, which then enters into the pipe body 1.

Referring to that shown in FIG. 1 and FIG. 2A to FIG. 2C, the attachment 3 comprises a chamber portion 31 and a deflector portion 32. The chamber portion 31 is located in the first space S1. The chamber portion 31 comprises a chamber portion inlet 311 corresponding to the injection inlet 21 and a chamber portion outlet 312 corresponding to the opening 11 on the side wall of the pipe 1. The chamber portion 31 defines the second space S2. As shown in FIG. 1, the chamber portion 31 defines the path of the spray 300 in the first space S1 comprising that enters the second space S2. The deflector portion 32 extends from the side wall of the chamber portion 31, connects the pipe body 1 and the chamber inlet 311 of the chamber portion 31 fluidly, and forms a swirl along the side wall of the deflector portion 32, the chamber portion 31 and the chamber inlet 311, so as to make the attachment 3 constitutes a swirl structure that forms the exhaust swirl movement at the chamber inlet 311. Therefore, the swirling exhaust can be generated near the chamber inlet 311, enter the interior of the chamber 31, enter the second space S2, and flow out of the chamber outlet 312. Such a beneficial effect is that the urea crystallization phenomenon of mixer 10 can be effectively alleviated. In practice, the inventor accidentally found that there will be more urea crystals at the nozzle 201 of the doser 20 and around the injection inlet 21 of the corresponding doser mounting base 2, especially when the exhaust temperature entering the mixer is low, such as when the exhaust temperature entering the mixer 10 from the pipe body 1 is less than 350° C.

Figure 3A:
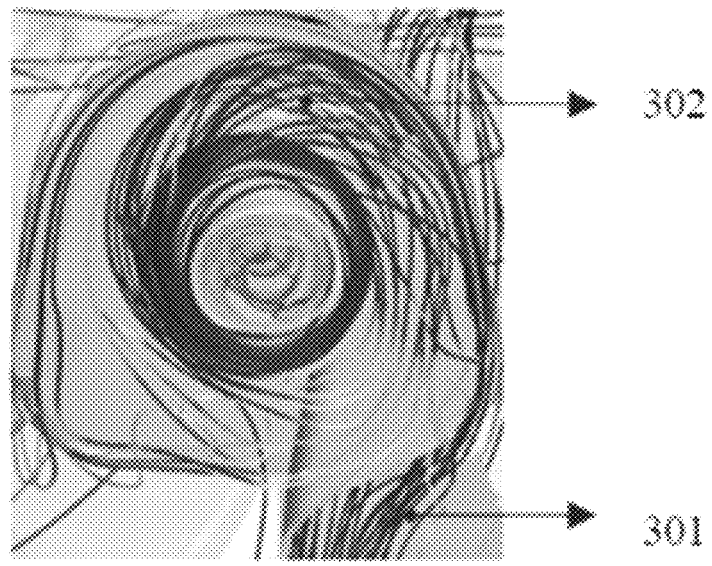
FIG. 3A and FIG. 3B are flowcharts of the exhaust flow of the attachment of an embodiment.
Figure 3A:
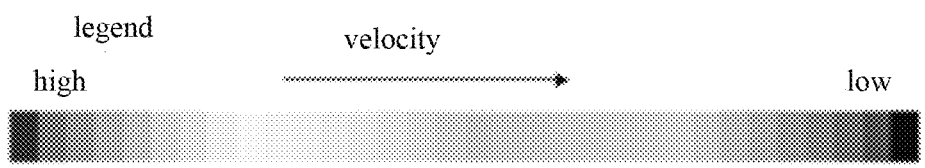
Figure 3B:
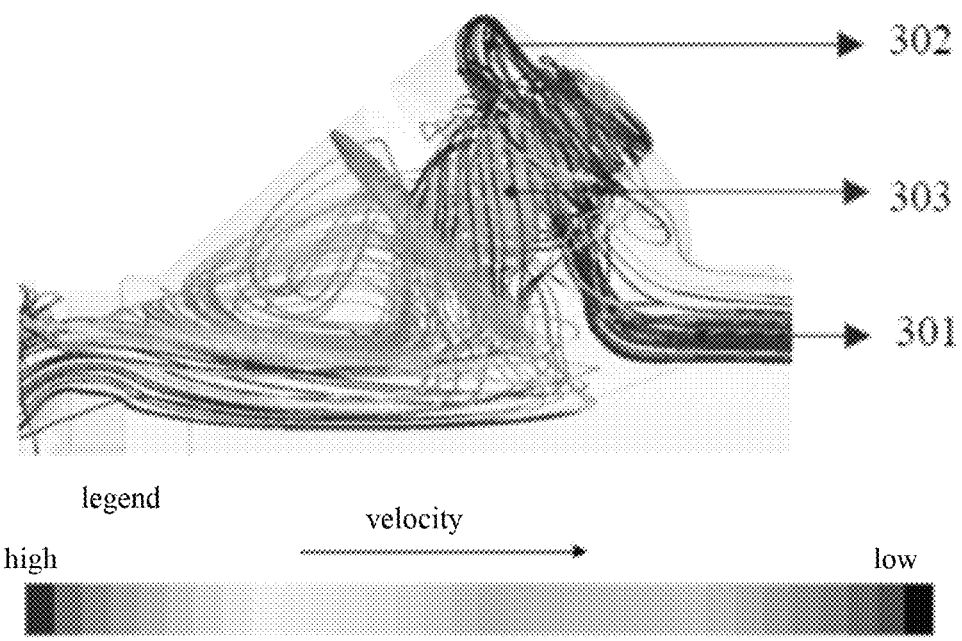
Figure 4A:
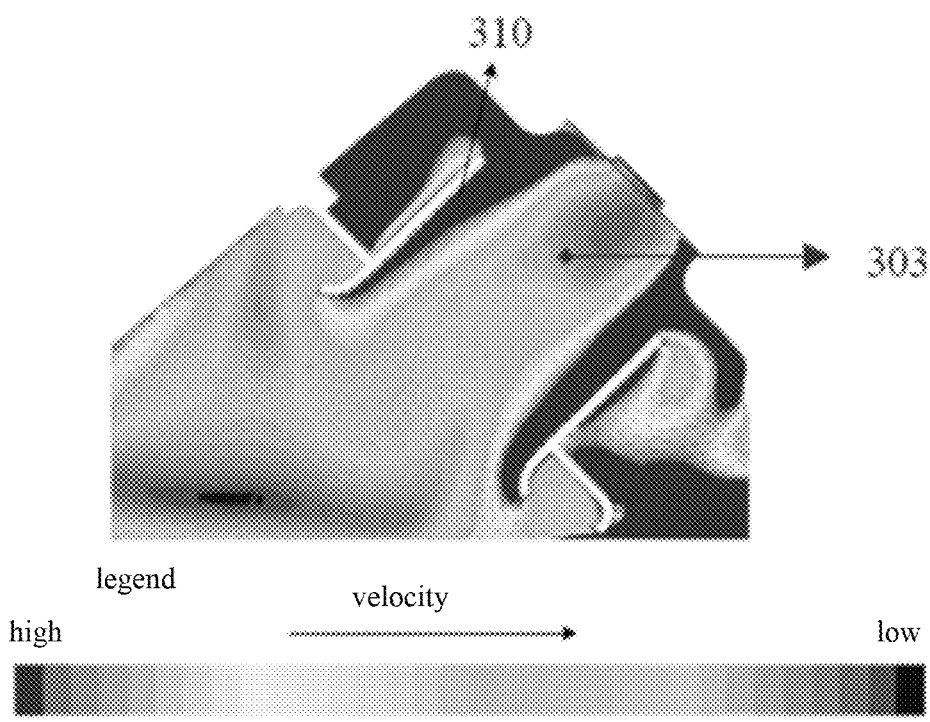
FIG. 4A and FIG. 4B are the fluid simulation results of the chamber portion of the cylindrical member and the conical chamber portion respectively.
Figure 4B:
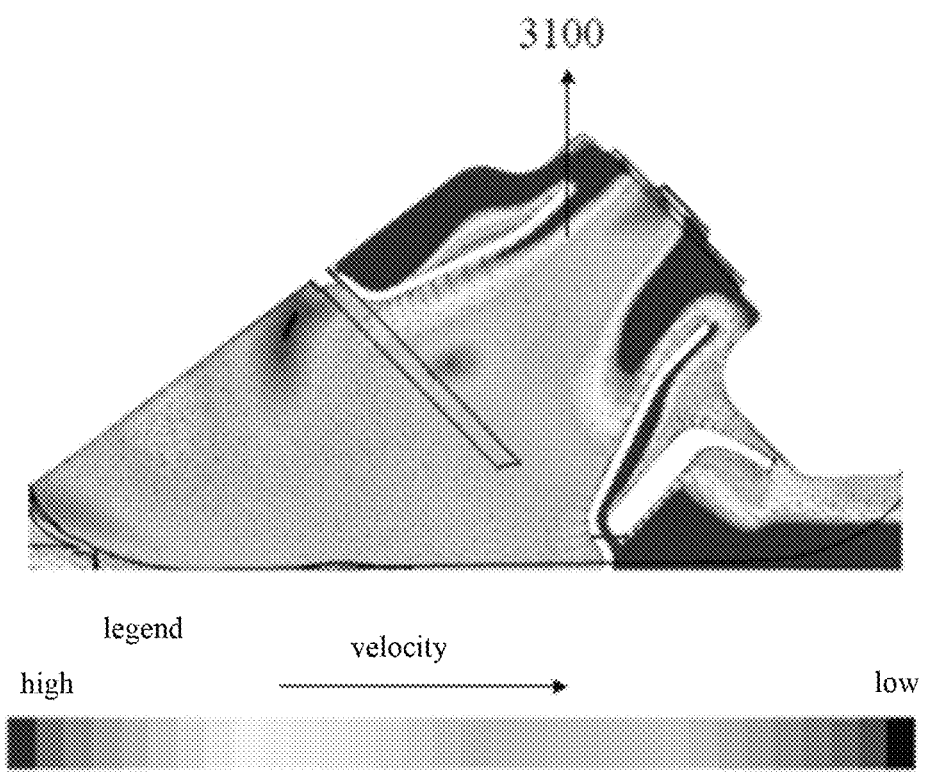

In the proposal introduced in the above embodiment, the urea crystallization around the nozzle 201 of the doser 20 and the injection inlet 21 of the corresponding doser mounting base 2 is significantly reduced, which alleviates the urea crystallization phenomenon inside the mixer 10 and makes the mixer meet the requirements. The principle may be that, as shown in the streamline diagram shown in FIG. 3A and FIG. 3B, since the exhaust flows from the air flow 301 of the deflector portion 32 at a faster speed, a swirling air flow 302 is generated near the inlet 311 of the chamber section. From the velocity distribution, it can also be seen that a swirling air flow is formed, because the velocity of the air flow 302 is lower than that of the air flow 301, and enters the interior of the chamber section 31 to form a further swirling air flow 303, that is, it enters the second space S2 until it flows out of the chamber outlet 312, thereby further strengthening the swirl intensity of the air flow 303. From the velocity distribution, it can also be seen that the swirl is further strengthened, because the velocity of the air flow 303 is lower than that of the air flow 302. From FIG. 3B, it can be seen that the air flow 303 flows out of the chamber outlet 312 and merges with the high-speed air flow of the pipe 1, making the spray 300 enter from the spray inlet 21 and fully contact and mix with the hot swirling exhaust quickly, and making the spray particles diffused from the spray 300 to the nozzle 201 of the doser 20 and around the spray inlet 21 of the corresponding doser mounting base 2 be swirled into the interior of the chamber 31. Moreover, even if a small part of the particles diffuse around the nozzle 201 and the injection inlet 21 of the corresponding doser mounting base 2, as well as accumulate and gather to form droplets or liquid films of urea, the swirling flow of the chamber inlet 311 can purge and decompose them in time. Moreover, because the swirl is formed near the inlet 311 of the chamber, the negative effect of the impact of the excessive swirl intensity on the spray is also reduced, so that the spray 300 can fully extend and diffuse in the mixer along the established spray direction, ensuring a sufficient mixing distance between the spray and the exhaust gas, so as to fully decompose urea as well as fully and evenly mix with the exhaust gas. In addition, the structure of attachment 3 is simple and has little impact on the exhaust back pressure. Moreover, a good versatility is achieved, which can adapt to a variety of structures of doser, as well as a variety of engine working requirements.

Continuing to refer to FIG. 1, in some embodiments, the chamber inlet 311 of the chamber 31 is arranged non-contact with the injection inlet 21 of the doser mounting base 2, and the gap G1 between the chamber inlet 311 and the injection inlet 21 is less than 10 mm. In this way, the exhaust forming swirl can play a sufficient role in the particles diffused from the spray beam and the droplets or liquid films formed by accumulation. It can be understood that the lower limit of the gap G1 can be adjusted according to the actual situation to meet the requirements of the exhaust for forming enough swirl to enter the interior of the chamber 31.

Continuing to refer to FIG. 1 and FIG. 2A to FIG. 2C, in one or more embodiments, the specific structure of the chamber 31 also comprises a cylindrical member 310, which is located in the first space S1. The openings 3101 and 3202 at both axial ends of the cylindrical member 310 are the chamber inlet 311 and the chamber outlet 312 respectively. The side wall 3103 of the cylindrical member 310 is a closed structure, that is, there is no structures such as openings in the side wall 3103, so that the exhaust can directly pass through the side wall 3103 and enter the interior of the cylindrical member 310.

The deflector portion 32 comprises a deflector member 320 extending from the side wall 3103 of the cylindrical member 310. The deflector member 320 comprises a first catch plate 3201 extending from the side wall 3103 of the cylindrical member through the opening 11 to the inside of the pipe body 1, and a second catch plate 3202 intersecting with the first catch plate 3201. Preferably, the first catch plate 3201 is a flat plate structure, extending from the side wall 3103 of the cylindrical member 310 perpendicular to the axis of the cylindrical member 310. The second catch plate 3202 is also a flat plate structure, perpendicular to the first catch plate 3201, and also extends from the side wall 3103 of the cylindrical member 310.

Such a beneficial effect is that the swirling movement can be made more stable, and the exhaust flows along the flow path of the deflector portion 32, the side wall 3103, the chamber inlet 311, the interior of the chamber 31 and the chamber outlet 312, ensuring the stability of the mixing process of the spray 300 and the swirling exhaust. The specific effect comparison can be referred by FIG. 4A and FIG. 4B. In some embodiments, by adapting the chamber portion with cylindrical member 310 shown in FIG. 4A, compared with the chamber portion with conical part 3100 shown in FIG. 4B, the flow of the cylindrical member 310 is stable, and the mixing effect of the spray and the swirling exhaust is better, while the conical part 3100 will cause the instability of swirl, resulting in poor mixing effect. However, it can be understood that it is not limited here that the chamber 31 cannot have a conical structure. In some embodiments, the exhaust flow of the engine is always small, the flow velocity is slow, and the swirl structure formed is generally relatively stable. In addition, the cylindrical member 310 with openings at both ends and closed side walls is adopted. After being guided to the side wall 3103 of the cylindrical member 310 by the deflector member 320, a swirl flow can be formed by the movement of the exhaust around the side wall 3103. The structure of the attachment is simple, which can also make the formed swirl structure more mild, so as to prevent the impact of too strong swirl on the spray and the negative effect of disturbance. With the structure of the first catch plate 3201 and the second catch plate 3202, the structure of the deflector portion 32 is simple, which can accurately guide the exhaust air flow to the side wall 3103 of the cylindrical member 310.

It can be understood that the cylindrical member 310 described in the above embodiment is not strictly cylindrical. As shown in FIGS. 2A to 2C, the chamber outlet 312 is a gradually expanding horn shape. In addition, the side wall 3103 of the closed cylindrical member 310 is not limited to the smooth surface structure shown in the figure. If the smooth surface cannot meet the strength requirements of the swirl, spiral channels, guide vanes and other structures or elements can also be added on the smooth surface to strengthen the swirl.

In addition, in one or more embodiments, the cylindrical member 310 can also achieve the effect of swirling flow through a compact structure. The space occupied by the cylindrical member 310 is generally less than 25 mm high, so that the structure of the first space S1 provided by the doser 20 is compact, which can meet the different requirements of the spatial arrangement of the vehicle for the mixer 10 and the exhaust system 100.

Referring to FIG. 1, in some embodiments, the axis X1 of the doser 20 coincides with the axis X2 of the chamber 31. For example, as shown in FIG. 1, the spray 300 of the doser 20 can be a plurality of spray beams, and the chamber 31 is a cylindrical member 310. At this time, the axis of the doser 20 refers to that the centerline A1 of the plurality of sprays 300 coincides with the axis A2 of the cylindrical member 310. The structure of overlapping axes can further optimize the mixing effect of the swirling exhaust formed by the chamber 31 and the spray.

Continuing to refer to FIGS. 2A to 2C, in an embodiment, the deflector member 320 also comprises a controlling plate 3203, which is arranged opposite to the first catching plate 3201. The axial position thereof is located between the chamber inlet 311 and the first catching plate 3201. The "axial position" here and below, as shown in FIGS. 2A and 2C, refers to the axial direction of the cylindrical member 310. The beneficial effect of setting the controlling plate 3203 is that it can make the formed swirl milder, prevent the exhaust swirl from flowing into the interior of the cylindrical member 310 too soon, and make the mixing effect of the swirling exhaust and the spray more stable. Continuing to refer to FIGS. 2A to 2C, in an embodiment, the specific structure of the controlling plate 3203 may comprise a first controlling plate 32031, which is arranged corresponding in the axial position of the chamber inlet 311, partially surrounds the chamber inlet 311, and connected with the second catching plate 3202. The first catching plate 3201 is parallel to the first controlling plate 32031. Both ends of the second catching plate 3202 are connected with the first controlling plate 32031 and the first catching plate 3201 respectively. In this way, the swirl formed by the circumferential flow around the side wall 3103, guided from the catching plate to the side wall 3103 of the cylindrical part 310 can be limited as much as possible, and the proportion of axial flow along the side wall 3103 can be reduced.

Figure 2A:
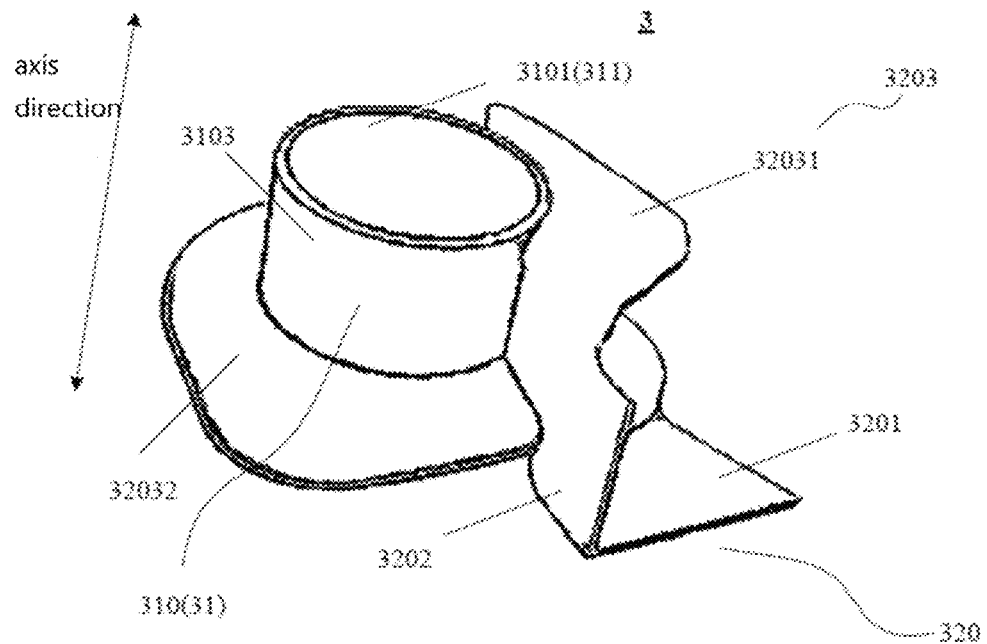
FIGS. 2A to 2C are structural diagrams of attachments of an embodiment.
Figure 2B:
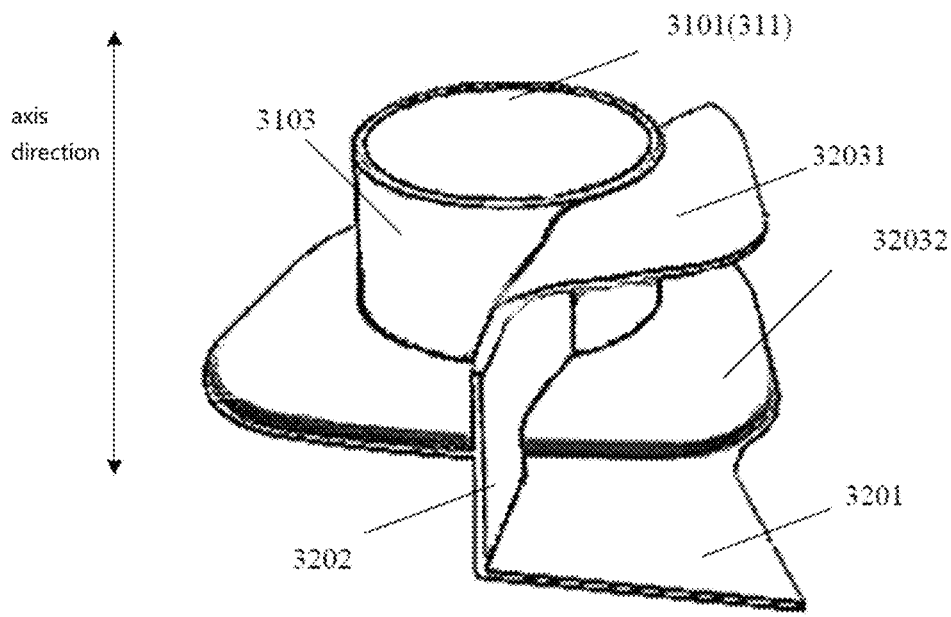
Figure 2C:
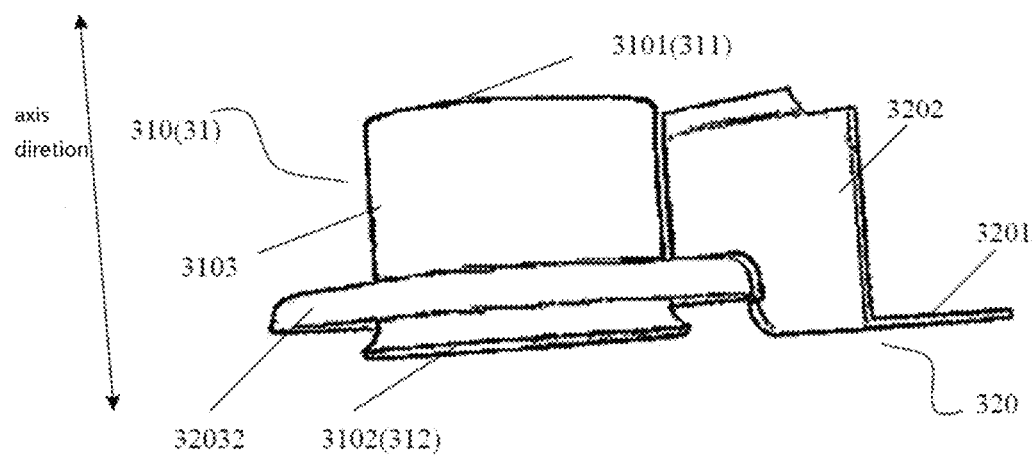

Continuing to refer to FIGS. 2A to 2C, in some embodiments, the controlling plate 3203 also comprises a second controlling plate 32032, which surrounds the side wall 3103 of the cylindrical member 310 all around. The axial position of the second controlling plate 32032 is located between the axial positions of the first catching plate 3201 and the first controlling plate 32031. In this way, the formed swirl can be further stabilized. The second controlling plate 32032 and the first catching plate 3201 can be an integral part, which is connected through the step structure 3204, while the second catching plate 3202 and the first controlling plate 32031 can be an integral part. Alternatively, the first controlling plate 32031, the second catching plate 3202 and the first catching plate 3201 may be an integral part. Alternatively, the deflector member 320 formed by the first controlling plate 32031, the second controlling plate 32032, the second catching plate 3202 and the first catching plate 3021 can be an integral part, or even the attachment 3 can be an integral part. The forming method of the integral part can be casting, 3D printing, etc. For the integral part with simple structure, such as the integral part of the second controlling plate 32032 and the first catching plate 3201, stamping and other processes can be adopted. The specific forming process of the integral part can be comprehensively selected according to factors such as cost and efficiency.

It can be seen from the above that the beneficial effects of using the above embodiment to introduce the mixer and exhaust system comprise, but are not limited to, reducing urea crystallization and having little impact on the exhaust back pressure by setting the structure of attachment in the mounting base, as well as the structure of the chamber and deflector portion of attachment. At the same time, the mixer has good versatility and can adapt to dosers with various structures. The exhaust system has good performance in treating nitrogen oxides.

Although the above embodiments of the application are disclosed as above, they are not used to limit the application. Any person skilled in the art can make possible changes and modifications without departing from the spirit and scope of the application. Therefore, any amendments, equivalent changes and modifications made to the above embodiments according to the technical essence of the application without departing from the technical proposal of the application fall within the scope of protection defined in the claims of the application.

We claim:

1. A mixer, comprising:
a pipe, comprising a side wall, wherein the side wall comprises an opening;
a doser mounting base, provided on the opening of the side wall of the pipe, connecting the pipe through the opening, defining a first space, and comprising an injection inlet; and
an attachment, comprising a chamber portion and a deflector portion, wherein the chamber portion comprises a chamber portion inlet corresponding to the injection inlet and a chamber portion outlet corresponding to the opening of the side wall of the pipe; and the deflector portion extends from a side wall of the chamber portion and makes the pipe, the side wall of the chamber portion and the chamber portion inlet fluidly connected, and the attachment constitutes a swirling structure that forms a swirling movement of exhaust at the chamber portion inlet;
wherein the chamber portion comprises a cylindrical member located on the first space, two ends of the cylindrical member are respectively the chamber portion inlet and the chamber portion outlet, a side wall of the cylindrical member is a closed structure, the deflector portion comprises a deflecting member extending from the side wall of the cylindrical member, and the deflecting member comprises a first catching plate, which extends from the side wall of the cylindrical member into the pipe through the opening of the side wall of the pipe, and a second catching plate, which intersects the first catching plate.

2. The mixer of claim 1, wherein the chamber portion inlet and the injection inlet are arranged in a non-contact manner, and a gap between the chamber portion inlet and the injection inlet is less than 10 mm.

3. The mixer of claim 1, wherein the deflecting member comprises a controlling plate, the controlling plate is arranged opposite to the first catching plate, and an axial position of the controlling plate is between the chamber portion inlet and the first catching plate; and the first catching plate is perpendicular to an axis of the cylindrical member, and the second catching plate is perpendicular to the first catching plate.

4. The mixer of claim 3, wherein the controlling plate comprises a first controlling plate, arranged at an axial position corresponding to the chamber portion inlet, partially surrounding the chamber portion inlet, and connecting with the second catching plate;
and the first catching plate is parallel to the first controlling plate, and two ends of the second catching plate are respectively connected with the first controlling plate and the first catching plate.

5. The mixer of claim 4, wherein the controlling plate further comprises a second controlling plate, the second controlling plate fully surrounds the side wall of the cylindrical member, and an axial position of the second controlling plate is located between the axial positions of the first catching plate and the first controlling plate.

6. The mixer of claim 5, wherein the second controlling plate and the first catching plate are integrated, whose connect structure is a step structure, and the second catching plate and the first controlling plate are integrated; or the first controlling plate, the second catching plate and the first catching plate are integrated; or the deflector portion is integrally formed; or the attachment is integrally formed.

7. The mixer of claim 1, wherein height of the cylindrical member is less than 25 mm.

8. An exhaust system, comprising:
a mixer, comprising a pipe, comprising a side wall, wherein the side wall comprises an opening; a doser mounting base, provided on the opening of the side wall of the pipe, connecting the pipe through the opening, defining a first space, and comprising an injection inlet; and an attachment, comprising a chamber portion and a deflector portion, wherein the chamber portion comprises a chamber portion inlet corresponding to the injection inlet and a chamber portion outlet corresponding to the opening of the side wall of the pipe; and the deflector portion extends from the side wall of the chamber portion and makes the pipe, the side wall of the chamber portion and the chamber portion inlet fluidly connected, and the attachment constitutes a swirling structure that forms a swirling movement of exhaust at the chamber portion inlet; and a doser, wherein the pipe is used for providing flow of exhaust, the doser is used for injecting a reductant spray to the mixer, and the doser is set on the doser mounting base;

wherein the chamber portion comprises a cylindrical member located on the first space, two ends of the cylindrical member are respectively the chamber portion inlet and the chamber portion outlet, a side wall of the cylindrical member is a closed structure, the deflector portion comprises a deflecting member extending from the side wall of the cylindrical member, and the deflecting member comprises a first catching plate, which extends from the side wall of the cylindrical member into the pipe through the opening of the side wall of the pipe, and a second catching plate, which intersects the first catching plate.

9. The exhaust system of claim 8, wherein an axis of the doser coincides with an axis of the chamber portion.

10. The exhaust system of claim 8, wherein the chamber portion inlet and the injection inlet are arranged in a non-contact manner, and a gap between the chamber portion inlet and the injection inlet is less than 10 mm.

11. The exhaust system of claim 8, wherein the deflecting member comprises a controlling plate, the controlling plate is arranged opposite to the first catching plate, and an axial position of the controlling plate is between the chamber portion inlet and the first catching plate; and the first catching plate is perpendicular to an axis of the cylindrical member, and the second catching plate is perpendicular to the first catching plate.

12. The exhaust system of claim 11, wherein the controlling plate comprises a first controlling plate, arranged at an axial position corresponding to the chamber portion inlet, partially surrounding the chamber portion inlet, and connecting with the second catching plate;

and the first catching plate is parallel to the first controlling plate, and two ends of the second catching plate are respectively connected with the first controlling plate and the first catching plate.

13. The exhaust system of claim 12, wherein the controlling plate further comprises a second controlling plate, the second controlling plate fully surrounds the side wall of the cylindrical member, and an axial position of the second controlling plate is located between the axial positions of the first catching plate and the first controlling plate.

14. The exhaust system of claim 13, wherein the second controlling plate and the first catching plate are integrated, whose connect structure is a step structure, and the second catching plate and the first controlling plate are integrated; or the first controlling plate, the second catching plate and the first catching plate are integrated; or the deflector portion is integrally formed; or the attachment is integrally formed.

15. The exhaust system of claim 8, wherein height of the cylindrical member is less than 25 mm.

* * * * *